(12) United States Patent
Lampton

(10) Patent No.: US 10,753,488 B2
(45) Date of Patent: Aug. 25, 2020

(54) THREE-WAY HYDRAULIC VALVE WITH A FLOATING BUSHING

(71) Applicant: Sun Hydraulics, LLC, Sarasota, FL (US)

(72) Inventor: Chad Lampton, Sarasota, FL (US)

(73) Assignee: Sun Hydraulics, LLC, Sarasota, FL (US)

(*) Notice: Subject to any disclaimer, the term of this patent is extended or adjusted under 35 U.S.C. 154(b) by 251 days.

(21) Appl. No.: 16/054,861

(22) Filed: Aug. 3, 2018

(65) Prior Publication Data

US 2020/0041013 A1 Feb. 6, 2020

(51) Int. Cl.
| | | |
|---|---|---|
| *F16K 11/04* | (2006.01) | |
| *F15B 13/04* | (2006.01) | |
| *F16K 11/07* | (2006.01) | |
| *F16K 31/06* | (2006.01) | |
| *F16K 11/044* | (2006.01) | |
| *F16K 1/44* | (2006.01) | |

(52) U.S. Cl.
CPC ...... *F16K 11/0712* (2013.01); *F16K 31/0606* (2013.01); *F16K 31/0613* (2013.01); *F15B 13/0405* (2013.01); *F16K 1/443* (2013.01); *F16K 11/044* (2013.01); *Y10T 137/86614* (2015.04)

(58) Field of Classification Search
CPC ............. F16K 11/0712; F16K 31/0606; F16K 31/0613; F16K 11/044; F16K 1/44; F16K 1/443; F16K 27/0263; F16K 27/029; F16K 31/0627; F16F 13/1463; F16F 13/28; F15B 13/0405; F15B 2013/041; F15B 2211/3138; F15B 2211/31576; F15B 2211/7052; Y10T 137/86614; Y10T 137/86702; Y10T 137/8667
See application file for complete search history.

(56) References Cited

U.S. PATENT DOCUMENTS

| | | | | |
|---|---|---|---|---|
| 5,771,931 | A * | 6/1998 | Watson | ............... E21B 33/0355 137/236.1 |
| 6,701,959 | B1 * | 3/2004 | Flynn | .................... F15B 13/044 137/625.65 |
| 2009/0224192 | A1 * | 9/2009 | Oikawa | ............... F16K 11/0716 251/129.15 |
| 2017/0306946 | A1 * | 10/2017 | Frick | ....................... F04B 1/324 |

* cited by examiner

*Primary Examiner* — Kelsey E Cary
(74) *Attorney, Agent, or Firm* — McDonnell Boehnen Hulbert & Berghoff LLP

(57) ABSTRACT

An example valve includes: a housing having a first longitudinal cavity therein; a sleeve disposed, at least partially, in the first longitudinal cavity, where the sleeve has a second longitudinal cavity therein, and includes a first seat formed as a protrusion from an interior peripheral surface of the sleeve; a poppet mounted within the second longitudinal cavity and configured to move axially therein; and a bushing mounted, at least partially, in the second longitudinal cavity, such that the bushing is floating and is allowed to move axially in the second longitudinal cavity, where the bushing is hollow and defines a first port at a distal end of the bushing and defines a second seat at a proximal end of the bushing, and where the sleeve defines a second port and a third port disposed on an exterior peripheral surface of the sleeve.

20 Claims, 9 Drawing Sheets

THREE-WAY HYDRAULIC VALVE WITH A FLOATING BUSHING

BACKGROUND

A hydraulic valve directs the flow of a liquid medium, usually oil, through a hydraulic system. The direction of the oil flow is determined by the position of a spool or a poppet. The size of the valve may be determined by the maximum flow of the hydraulic system through the valve and the maximum system pressure.

An example valve may have a movable element, e.g., a poppet, inside a sleeve, which is disposed inside a housing. It may be desirable to have a retention mechanism that retains the sleeve within the housing when the valve is being handled (e.g., shipped, packaged, etc.) such that the sleeve is not disassembled from the housing prior to installation. It may also be desirable to have a retention mechanism that allows disassembly of the sleeve from the housing for maintenance purposes, for example, without damaging the valve.

An example three-way valve may include a poppet that is movable by an actuation mechanism (e.g., electric, hydraulic, pneumatic, or manual). The poppet may be seated on a valve seat formed inside the sleeve, thus allowing flow from a first port to a second port. Once the valve is actuated, the poppet moves off the seat and can be seated on a bushing inserted within the sleeve thus allowing fluid flow from the first port to a third port.

In conventional valves, the bushing can be screwed inside the sleeve, or in other examples, the bushing can be retained within the sleeve via a nut that is screwed inside the sleeve and/or the bushing. Adding threads to components of the valve increases manufacturing cost. Further, with a configuration where the bushing is threaded inside the sleeve or retained by a threaded nut, the bushing, sleeve, and housing are made to be precisely concentric to allow for operation of the valve without leakage. The valve can leak if there are slight misalignments between its components. Controlling tolerance of the parts of the valve to high concentricity precision adds further cost to the valve. It may thus be desirable to have a valve that does not involve threading and can tolerate misalignments between the parts. It is with respect to these and other considerations that the disclosure made herein is presented.

SUMMARY

The present disclosure describes implementations that relate to a three-way hydraulic valve with a floating bushing. In a first example implementation, the present disclosure describes a valve. The valve includes: (i) a housing having a first longitudinal cavity therein; (ii) a sleeve disposed, at least partially, in the first longitudinal cavity, wherein the sleeve has a second longitudinal cavity therein, and includes a first seat formed as a protrusion from an interior peripheral surface of the sleeve; (iii) a poppet mounted within the second longitudinal cavity and configured to move axially therein; and (iv) a bushing mounted, at least partially, in the second longitudinal cavity, such that the bushing is floating and is allowed to move axially in the second longitudinal cavity, wherein the bushing is hollow and defines a first port at a distal end of the bushing and defines a second seat at a proximal end of the bushing, and wherein the sleeve defines a second port and a third port disposed on an exterior peripheral surface of the sleeve. When the valve is unactuated, the poppet is seated on the first seat of the sleeve, to block fluid flow between the second port and the third port, while allowing fluid communication between the first port and the second port. When the valve is actuated, the poppet moves off the first seat and is seated on the second seat of the bushing to allow fluid communication between the second port and the third port, while blocking fluid from to and from the first port.

In a second example implementation, the present disclosure describes an assembly. The assembly includes a valve. The valve includes: (i) a housing having (a) a first longitudinal cavity therein, (b) a first threaded region disposed on an exterior peripheral surface of the housing, and (c) a housing locating shoulder disposed on the exterior peripheral surface of the housing, (ii) a sleeve disposed, at least partially, in the first longitudinal cavity of the housing, wherein the sleeve has a second longitudinal cavity therein, (iii) a poppet mounted within the second longitudinal cavity and configured to move axially therein, and (iv) a bushing mounted, at least partially, within the second longitudinal cavity. The assembly also includes a manifold having a cavity configured to receive the valve therein. The manifold further includes: (i) a second threaded region disposed on an interior peripheral surface of the manifold, (ii) a manifold locating shoulder, and (iii) a nose support shoulder. The first threaded region of the valve threadedly engages the second threaded region of the manifold, the housing locating shoulder mates with the manifold locating shoulder, and a gap separates a distal end of the bushing from the nose support shoulder of the manifold, thereby causing the bushing to be floating within the cavity of the manifold.

In a third example implementation, the present disclosure describes a method. The method includes: (i) providing a manifold having a cavity, wherein the manifold is configured to have a first port, a second port, and a third port configured to align with and be fluidly coupled to respective ports of a valve, wherein the manifold comprises: (a) a first threaded region disposed on an interior peripheral surface of the manifold, (b) a manifold locating shoulder, and (c) a nose support shoulder, and wherein the valve comprises: (a) a housing having a first longitudinal cavity therein, a second threaded region disposed on an exterior peripheral surface of the housing, and a housing locating shoulder disposed on the exterior peripheral surface of the housing, (b) a sleeve disposed, at least partially, in the first longitudinal cavity of the housing, wherein the sleeve has a second longitudinal cavity therein, and (c) a bushing mounted, at least partially, within the second longitudinal cavity; (ii) inserting the valve into the cavity of the manifold; and (iii) screwing the second threaded region of the housing into the first threaded region of the manifold until the housing locating shoulder mates with the manifold locating shoulder, such that a gap separates a distal end of the bushing from the nose support shoulder of the manifold, thereby causing the bushing to be floating within the cavity.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
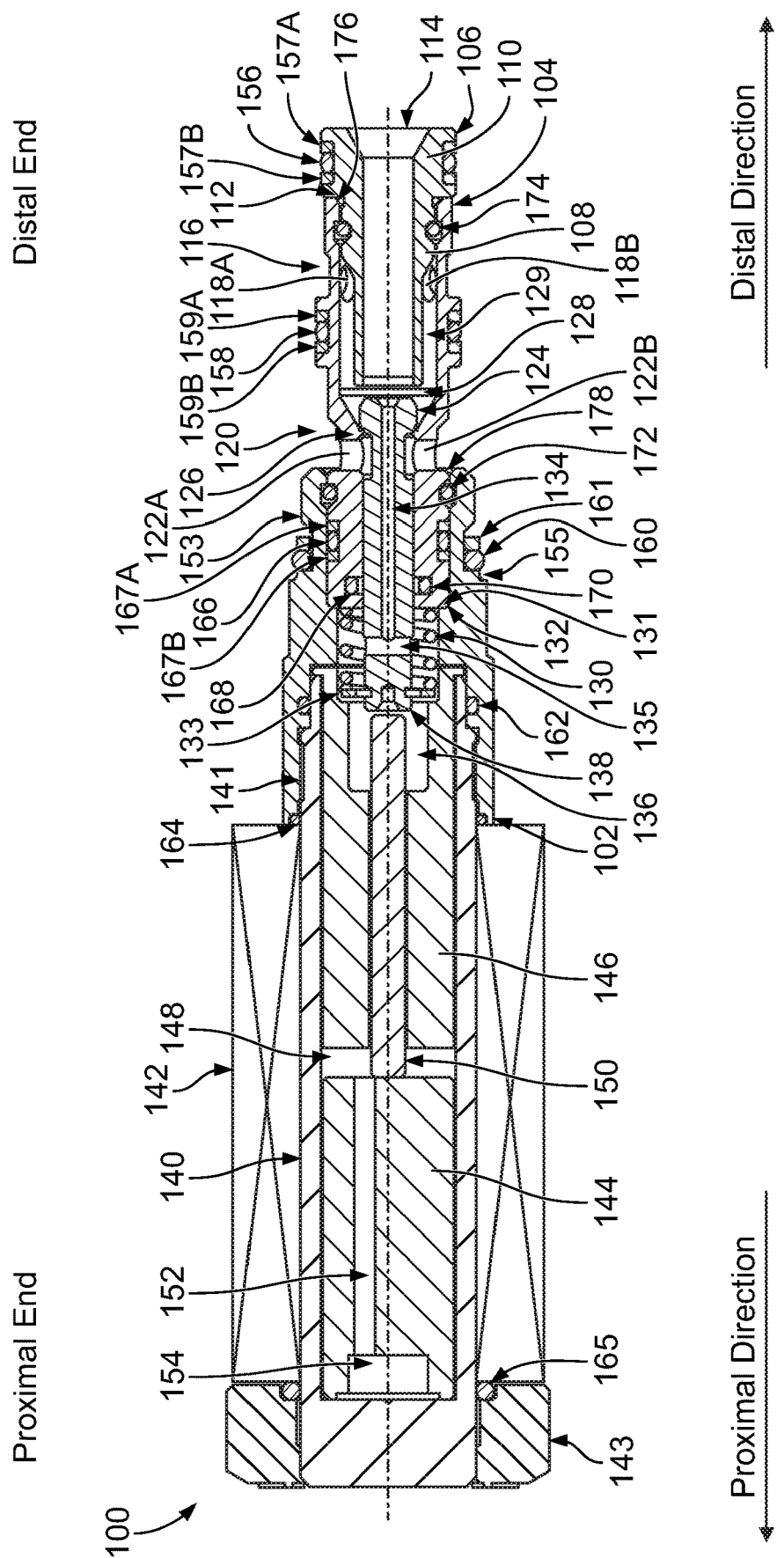
FIG. 1 illustrates a cross-sectional side view of a valve configured as a three-way valve, in accordance with an example implementation.

Example valves can include an external component having a cavity in which an internal component is inserted. For example, the valve can have a housing configured to include other components of the valve such as a sleeve that can be inserted, at least partially, within the housing. The valve can then be disposed in a cavity of a manifold, to operate within a hydraulic system.

However, during handling the valve prior to installation into the manifold (e.g., during shipping and packaging), it may be desirable to retain the internal component within the external component to preclude disassembly of the valve prior to installation within the manifold. It may be desirable for a retention mechanism to facilitate insertion of the internal component with a low force inside the external component, yet resist disassembly with a large force to enable the valve to withstand forces experienced during handling. When a large force (e.g., via a pneumatic puller) is applied and overcomes the retention mechanism, the internal component can be withdrawn from the external component to, for example, perform maintenance operations on the valve.

In further examples, a valve can be configured as a three-way valve having a sleeve disposed in a housing, with a poppet movable with the sleeve. The poppet can be configured to move between a first seat formed in the sleeve and a second seat formed by a bushing inserted into the sleeve.

In examples, the bushing can be screwed into the sleeve to be retained therein. In other examples, a threaded nut can engage corresponding threads in the bushing to retain the bushing within the sleeve. Using threads can increase the cost of the valve due to the cost of making the threads in the components and additionally due to the cost involved in ensuring concentricity of the threaded components to preclude leakage. Further, a valve configuration involving the use of threads might not tolerate any misalignment between the components and can cause leakage if there are any misalignments. It may thus be desirable to have a configuration where the bushing is retained in the sleeve without threading. It may further be desirable to have the bushing configured to be floating within the sleeve so as to allow for realignment of the bushing with other components of the valve so as to compensate or adjust for any manufacturing misalignments. Such a valve can be cheaper to manufacture due to elimination of threads and tolerance to misalignments.

Disclosed herein are valves having internal components that are not retained within external components of the valve via threading. Rather, the disclosed valves have grooves with particular geometries that render retention O-rings disposed therein capable of retaining internal components within external components of the valve. Further, disclosed herein are valves and assemblies having a floating bushing that can compensate for any tolerance misalignments, rendering the valves cheaper to manufacture compared to conventional valves.

FIG. 1 describes a cross-sectional side view of a valve 100 configured as a three-way valve, in accordance with an example implementation. The valve 100 includes a housing 102 that defines a longitudinal cylindrical cavity therein. The longitudinal cylindrical cavity of the housing 102 is configured to receive at a distal end thereof a cage or sleeve 104 coaxial with the housing 102.

The sleeve 104 defines a respective longitudinal cylindrical cavity therein. The longitudinal cylindrical cavity of the sleeve 104 is configured to receive at a distal end thereof a bushing 106 coaxial with the sleeve 104 and the housing 102. The bushing 106 can be cylindrical in shape and can have a stem portion 108 and a base portion 110. The stem portion 108 extends within the sleeve 104, while the base portion 110 is configured as a protrusion, rim, or enlarged-diameter portion to form a shoulder 112 configured to interfaces with or rest against a distal end of the sleeve 104.

The bushing 106 defines a first port 114 at a nose or distal end of the bushing 106. The bushing 106 is hollow as depicted in FIG. 1 to allow fluid to flow therethrough to or from the first port 114.

The sleeve 104 includes a second port 116 defined as holes such as holes 118A, 118B configured as through-holes disposed in a radial array about an exterior surface of the sleeve 104. The sleeve 104 further includes a third port 120 defined as holes such as holes 122A, 122B configured as through-holes disposed in a radial array about the exterior surface of the sleeve 104. The valve 100 is configured to control flow of fluid between the first port 114, the second port 116, and the third port 120 as described below.

The valve 100 further includes a poppet 124 disposed in the longitudinal cylindrical cavity of the sleeve 104. The poppet 124 is coaxial with the housing 102, the sleeve 104, and the bushing 106. In the position shown in FIG. 1, the poppet 124 is seated on or at a seat 126 defined as a circumferential protrusion in an interior peripheral surface of the sleeve 104. The poppet 124 has a respective protrusion formed as a tapered circumferential surface that contacts the seat 126 when the poppet 124 is seated thereon.

In the position shown in FIG. 1, the poppet 124 blocks fluid flow between the third port 120 and the ports 114, 116. Also, in this position, a gap 128 separates a distal end of the poppet 124 from a proximal end of the bushing 106. Thus, in this position, fluid is allowed to flow between the first port 114 and the second port 116 through a hollow internal space of the bushing 106, the gap 128, and an annular space 129 formed between an exterior peripheral surface of the stem portion 108 of the bushing 106 and the interior peripheral surface of the sleeve 104.

As described below, when the valve 100 is actuated, the poppet 124 can move axially in a distal direction traversing the gap 128 until a distal end of the poppet 124 contacts the proximal end of the bushing 106. As such, the proximal end of the bushing 106 is configured as a seat for the poppet 124 when the valve 100 is actuated. In such an actuated position, the poppet 124 blocks fluid flow between the first port 114 and the second port 116 as it blocks the hollow internal space of the bushing 106. However, when the poppet 124 moves in the distal direction, it is unseated off the seat 126, thereby allow fluid flow between the second port 116 and the third port 120.

The valve 100 further includes a spring 130 disposed around an exterior peripheral surface of the poppet 124. A distal end of the spring 130 rests against a proximal end 131 of the sleeve 104, where the proximal end 131 of the sleeve 104 is configured to interface with or rest against a shoulder 132 formed as a protrusion from the interior peripheral surface of the housing 102. A proximal end of the spring 130 rests against or interfaces with a retaining ring 133 (e.g., E-type retaining ring) coupled to an exterior surface of the poppet 124. The spring 130 applies a force on the retaining ring 133, and thus on the poppet 124, in a closing direction (e.g., to the left in FIG. 1) to bias the poppet 124 toward the seat 126.

Further, the poppet 124 includes a longitudinal internal channel 134 and radial channels 135 that communicate fluid received at the first port 114 or the second port 116 to a chamber 136 defined at a back end 138 of the poppet 124. In this manner, if the first port 114 or the second port 116 is fluidly coupled to a source of pressurized fluid, the pressurized fluid at the first port 114 or the second port 116 is communicated to the back end 138 of the poppet 124. With this configuration, the pressurized fluid acts on both the front end and the back end 138 of the poppet 124, and thus the poppet 124 is pressure-balanced, and the spring 130 applying a force in the closing direction on the poppet 124 maintains the poppet 124 seated at the seat 126.

The poppet 124 is configured to move axially in the longitudinal cylindrical cavity defined within the sleeve 104 when the valve 100 is actuated by any type of actuation mechanisms such as a solenoid actuation mechanism. For example, the valve 100 may include a solenoid actuator having a solenoid tube 140 disposed within and received at a proximal end of the housing 102, such that the solenoid tube 140 is coaxial with the housing 102. As an example, the solenoid tube 140 can have external threads at a distal end thereof configured to threadedly engage respective internal threads formed at the proximal end of the housing 102 so as to couple the solenoid tube 140 to the housing 102. Such threads are depicted in FIG. 1 by threaded region 141.

The valve 100 can further include a solenoid coil 142 disposed about an exterior surface of the solenoid tube 140. The solenoid coil 142 can be retained between the proximal end of the housing 102 and a coil nut 143 that can be threadedly coupled to threads at a proximal end of the solenoid tube 140.

The solenoid tube 140 can be cylindrical in shape and defines a chamber therein to house a plunger or armature 144 and a pole piece 146. The pole piece 146 is separated from the armature 144 by an airgap 148. Further, the armature 144 can be in contact with a push pin 150 disposed in the chamber of the solenoid tube 140 partially within the pole piece 146, partially in the airgap 148, and partially in the chamber 136 longitudinally adjacent the poppet 124. The push pin 150 can be coaxial with the housing 102, the sleeve 104, the poppet 124, the solenoid tube 140, the armature 144, and the pole piece 146.

The armature 144 defines therein a channel 152 that fluidly couples the airgap 148 to a chamber 154 defined within the armature 144 at a proximal end thereof. The chamber 154 is thus bounded by an interior surface of the proximal end of the solenoid tube 140 and an interior surface of the armature 144. As such, fluid received at the chamber 136 from any of the ports 114, 116, and 120 through the channels 134, 135 or through unsealed spaces between the poppet 124 and the sleeve 104 is communicated to the airgap 148, the channel 152, and the chamber 154. With this configuration, the armature 144 can be pressure-balanced with fluid acting on both its proximal and distal ends. Further, in examples, the chamber 154 can house a spring (not shown) that biases the armature 144 toward the push pin 150 such that there is no axial clearance or axial "play" between the armature 144 and the push pin 150, thus maintaining contact therebetween.

When an electric current is provided through the windings of the solenoid coil 142, a magnetic field is generated. The pole piece 146 is fixedly disposed (i.e., stationary or immovable) within the solenoid tube 140 and is composed of material of high magnetic permeability. The pole piece 146 accordingly directs the magnetic field through the airgap 148 toward the armature 144, which is movable and is attracted toward the pole piece 146. In other words, when an electric current is applied to the solenoid coil 142, the generated magnetic field forms a north and south pole in the pole piece 146 and the armature 144, and therefore the pole piece 146 and the armature 144 are attracted to each other. Because the pole piece 146 is fixed and the armature 144 is movable, the armature 144 can traverse the airgap 148 toward the pole piece 146.

As the armature 144 moves toward the pole piece 146, it causes the push pin 150 to move axially toward the poppet 124 as well. The push pin 150 then contacts the poppet 124 and causes the poppet 124 to move axially and be unseated off the seat 126. The poppet 124 then traverses the gap 128 and can be seated at the proximal end of the bushing 106, thereby forming a gap or a flow area between the exterior surface of the poppet 124 and the interior surface of the sleeve 104. As a result, fluid is allowed to flow between the second port 116 and the third port 120 via the annular space 129, around the poppet 124, through the flow area between the poppet 124 and the sleeve 104. When the poppet 124 is seated at the proximal end of the bushing 106, fluid flow is blocked to and from the first port 114.

Although the valve 100 is described herein with an electric solenoid actuation mechanism, other actuation mechanisms could be used. For instance, the valve 100 could be manually actuated where an operator pushes a lever or handle coupled to the push pin 150 or the poppet 124 to move it. In other examples, the valve 100 may be hydraulically or pneumatically actuated, where a source of pressurized fluid is communicated to the valve 100 to apply pressure to the push pin 150 and move it toward the poppet 124, or apply pressure directly to the poppet 124 to move it.

As described below with respect to FIG. 7, the valve 100 is configured to be inserted within a cavity of a manifold such that the first port 114, the second port 116, and the third port 120 of the valve 100 align with respective ports of the manifold for communication of fluid therebetween. Particularly, the housing 102 includes a threaded region 153 disposed on the exterior peripheral surface of the housing 102 configured to threadedly engage with a corresponding threaded region in the manifold to couple the valve 100 to the manifold. The housing 102 can further include a housing locating shoulder 155 configured to mate with a corresponding shoulder in the manifold to align the housing 102 within the cavity of the manifold. Such manifold can include other valves and hydraulic components and can be fluidly coupled (e.g., via pipes or hoses) to a source of pressurized fluid (e.g., a pump or accumulator) and a reservoir or tank having fluid at a low or atmospheric pressure.

The valve 100 is configured to have several sealing O-rings configured to be disposed between exterior surfaces of components of the valve 100 and interior surfaces of the manifold bounding the cavity in which the valve 100 is to be disposed so as to preclude leakage of fluid therebetween. The valve 100 can also be configured to have sealing O-rings configured to be disposed between internal components of the valve 100 to preclude leakage therebetween.

For example, the valve 100 can include an O-ring 156 disposed between back-up rings 157A, 157B in an annular groove formed on an exterior peripheral surface of the base portion 110 of the bushing 106. The valve 100 can also include an O-ring 158 disposed between back-up rings 159A, 159B in an annular groove formed on the exterior peripheral surface of the sleeve 104. The valve 100 can further include an O-ring 160 disposed between a back-up ring 161 and a shoulder formed in the housing 102.

The valve 100 can further include an O-ring 162 disposed in an annular groove formed in the interior peripheral surface of the housing 102 and interfacing with an exterior surface of the solenoid tube 140. The O-ring 162 is disposed on a distal side of the threaded region 141, and the valve 100 can include another O-ring 164 on a proximal side of the threaded region 141 at the proximal end of the housing 102. The valve 100 can further include an O-ring 165 disposed at a proximal end of the solenoid tube 140 in an annular groove formed on an internal peripheral surface of the coil nut 143.

Internally, the valve 100 can include an O-ring 166 disposed between back-up rings 167A, 167B in an annular groove formed on an exterior peripheral surface of the sleeve 104, and thus the O-ring 166 is configured to seal between the sleeve 104 and the housing 102. Further, to facilitate longitudinal or axial motion of the poppet 124 within the longitudinal cylindrical cavity of the sleeve 104, the valve 100 can include a sliding ring 168. For example, the sliding ring 168 can be configured as double-acting with an O-ring 170 configured as an energized seal adapted to dynamic applications (e.g., configured to accommodate sliding axial motion of the poppet 124 relative to the sleeve 104). The sliding ring 168 can provide minimal break out force, wear resistance, and low friction with no stick-slip characteristics as the poppet 124 moves. In other examples, a rod-type dynamic seal can be used.

As such, the valve 100 can include several O-rings at different locations along a length of the valve 100 that can seal spaces between exterior surfaces of the components of the valve 100 and interior surfaces of the manifold (i.e., manifold surfaces that bound the cavity in which the valve 100 is disposed).

In examples, however, the valve 100 is handled, packaged, and shipped as depicted in FIG. 1, i.e., without being installed in a manifold. As such, it may be desirable to retain the bushing 106 to the sleeve 104 and retain the sleeve 104 to the housing 102 prior to installation of the valve 100 in a manifold. It may also be desirable to enable inserting the sleeve 104 into the housing 102 and inserting the bushing 106 into the sleeve 104 via application of a small force, but resist disassembly with a large retention force.

In some conventional valves, an internal component (e.g., a sleeve) of a valve is coupled to an external component (e.g., a housing) via a threaded joint or via a wire ring. Using threads is costly and can involve tight tolerances. Using a wire ring can also be costly, may increase assembly time of the valve, and may preclude enabling automation of valve assembly. The valve 100 includes retention methodology and components that renders the valve 100 less costly to manufacture and can enable valve assembly automation and reduced assembly time compared to conventional retention mechanisms.

Particularly, the valve 100 includes a retention O-ring 172 configured to retain the sleeve 104 within the housing 102 and a retention O-ring 174 configured to retain the bushing 106 within the sleeve 104. Each of the retention O-rings 172, 174 is disposed in respective grooves having a particular geometry that enables resisting disassembly of respective components with a large retention force, while facilitating insertion of the components.

Figure 2:
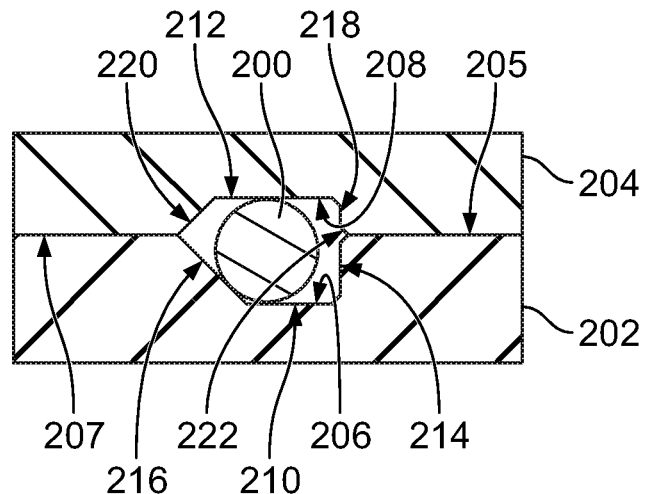
FIG. 2 illustrates a cross-sectional side view of a retention O-ring configured to retain an internal component of a valve within an external component of the valve, in accordance with an example implementation.

FIG. 2 illustrates a cross-sectional side view of a retention O-ring 200 configured to retain an internal component 202 of a valve within an external component 204 of the valve, in accordance with an example implementation. For example, the retention O-ring 200 can represent the retention O-ring 172 or the retention O-ring 174. The internal component 202 can represent the bushing 106 or the sleeve 104, whereas the external component 204 can represent the sleeve 104 or the housing 102, respectively.

As depicted in FIG. 2, the internal component 202 defines on an exterior peripheral surface 205 thereof an annular groove 206, whereas the external component 204 defines on an interior peripheral surface 207 thereof an annular groove 208. In examples, the annular groove 206 can be deeper than the annular groove 208. In other words, a distance from the exterior peripheral surface 205 of the internal component 202 to a base 210 of the annular groove 206 is larger than a distance from the interior peripheral surface 207 of the external component 204 to a base 212 of the annular groove 208.

Further, in examples, the annular groove 206 and the annular groove 208 are configured such that the depth of the annular groove 206 combined with the depth of the annular groove 208 is equal to or greater than a cross-sectional diameter "d" of the retention O-ring 200. As such, when the internal component 202 is inserted within the external component 204, the retention O-ring 200 is not compressed or not substantially compressed.

For example, to install the internal component 202 within the external component 204, first the retention O-ring 200 can be disposed in the annular groove 206 prior to insertion of the internal component 202 into the external component 204. The external component 204 can have a chamfer at an end thereof that causes the retention O-ring 200 to be slightly compressed as the internal component 202 is inserted into the external component 204. For instance, referring back to FIG. 1, the sleeve 104 can have at the distal end thereof a chamfered annular surface 176 that compresses the retention O-ring 174 as the bushing 106 is being inserted into the sleeve 104. Similarly, the housing 102 can have at the distal end thereof a chamfered annular surface 178 that compresses the retention O-ring 172 as the sleeve 104 is being inserted into the housing 102.

Referring back to FIG. 2, once the annular groove 206 is aligned with the annular groove 208, the retention O-ring 200 is decompressed or substantially decompressed and assumes the annular space formed between the annular groove 206 and the annular groove 208. As a result, the retention O-ring 200 might not be radially compressed. As an example for illustration, the retention O-ring 200 can have a cross-sectional diameter "d" of 0.054 inches (in), while the depth of the annular groove 206 can be about 0.035 in and the depth of the annular groove 208 can be about 0.019 in. As such the combined depth of the annular groove 206, 208 is equal to the cross-sectional diameter "d" of 0.054 in. The term "substantially decompressed" is used herein to indicate that the retention O-ring is not compressed or is slightly compressed such that the combined depth of the annular groove 206, 208 is slightly smaller (e.g., 2-5% smaller) than cross-sectional diameter "d" of 0.054 of the retention O-ring 200. In this case, the retention O-ring 200 is considered slightly compressed, but not to an extent that causes the retention O-ring 200 to deteriorate during operation of the valve.

In other examples, however, the annular groove 206 and the annular groove 208 are configured such that the depth of the annular groove 206 combined with the depth of the annular groove 208 may be slightly smaller than the cross-sectional diameter of the retention O-ring 200. In these examples, the retention O-ring 200 might be slightly compressed.

With this configuration where the retention O-ring 200 is not compressed or is not substantially compressed, the retention O-ring 200 does not operate to seal the space between the internal component 202 and the external component 204. Rather sealing is accomplished by other seals or O-rings, while the retention O-ring 200 retains the internal component 202 within the external component 204. For example, referring back to FIG. 1, the retention O-ring 172 does not operate to seal between the sleeve 104 and the housing 102; rather the O-ring 166, which is axially spaced from the retention O-ring 172, performs the sealing function. Similarly, the retention O-ring 174 does not operate to seal between the bushing 106 and the sleeve 104; rather the O-ring 156, which is disposed on the exterior peripheral surface of the base portion 110 of the bushing 106, performs the sealing function that would preclude seepage of fluid from the cavity of the manifold to the annular space 129.

Thus, whether during operation of the valve 100 or during endurance testing of the valve 100, the retention O-rings 172, 174 are not subjected to compressive forces from pressurized fluid. As a result, the retention O-rings 172, 174 do not deteriorate (e.g., do not wear) and they maintain their ability to retain their respective components when the valve 100 is being shipped and handled after testing or is being disassembled for maintenance purposes.

Further, configuration or geometry of the annular grooves 206, 208 causes the retention O-ring 200 to generate a large retention force. The annular groove 206 is bounded by a first annular surface 214 and a second annular surface 216. While the first annular surface 214 is substantially straight (e.g., forms a substantially 90 degree angle with the base 210), the second annular surface 216 is angled. As an example for illustration, the second annular surface 216 can make an angle between 30 degrees and 60 degrees with the base 210. However, other angles that are smaller or large can also be used.

Similarly, the annular groove 208 is bounded by a third annular surface 218 and a fourth annular surface 220. The third annular surface 218, which is disposed diagonally opposite from the second annular surface 216, forms a corner 222 with interior peripheral surface 207. In other words, the corner 222 is diagonally opposite from the second annular surface 216, which is angled. In examples, the corner 222 can be configured to have a particular radius rather than being a sharp corner or have a sharp tip. As an example for illustration only, the radius of the corner 222 can be between 0.005 in and 0.01 in.

To disassemble the internal component 202 from the external component 204, the components 202, 204 can be pulled relative to each other, e.g., the internal component 202 can be pulled to the right in FIG. 2 or the external component 204 can be pulled to the left in FIG. 2. As a result of the second annular surface 216 being angled, the second annular surface 216 pushes or presses the retention O-ring 200 against the corner 222. If the corner 222 has a sharp tip, the retention O-ring 200 might be subjected to compressive stresses coupled with a cutting motion. On the other hand, if the corner 222 has a radius as depicted in FIG. 2, the retention O-ring 200 can rather be subjected to shear stresses. The retention O-ring 200 is configured such that its shear stress yield limit is larger than its compressive stress yield limit. As such, by virtue of the corner 222 having a radius, the pulling force that can overcome the retention force of the retention O-ring 200 is increased compared to if the corner 222 had a sharp tip.

Further, the annular grooves 206, 208 are configured such that the axial space between the annular surfaces 214, 218 on one side and the annular surface 216, 220 on the other side of the retention O-ring 200 is larger than the cross-sectional diameter "d" of the retention O-ring 200. In other words, the width of one or both of the annular grooves 206, 208 can be greater than the cross-sectional diameter "d" of the retention O-ring 200. As such, the retention O-ring 200 is not subjected to forces or stresses in an axial direction prior to pulling the components 202, 204 apart. In other words, when one of the components 202, 204 is pulled from the other component, the initial resistance force that the retention O-ring 200 causes might be about zero pound-force (lbf).

As pulling continues, the annular surface 216, by virtue of being angled, forces the retention O-ring 200 against the corner 222 and the retention O-ring resists pulling the components 202, 204 apart. As pulling continues further, the resistance force increases more as the retention O-ring 200 is squeezed between the annular surface 216 and the corner 222 until the shear stress yield limit of the retention O-ring 200 is reached, at which point, the retention O-ring 200 fails (e.g., rips apart), thereby allowing the internal component 202 to be disassembled from the external component 204.

Figure 3:
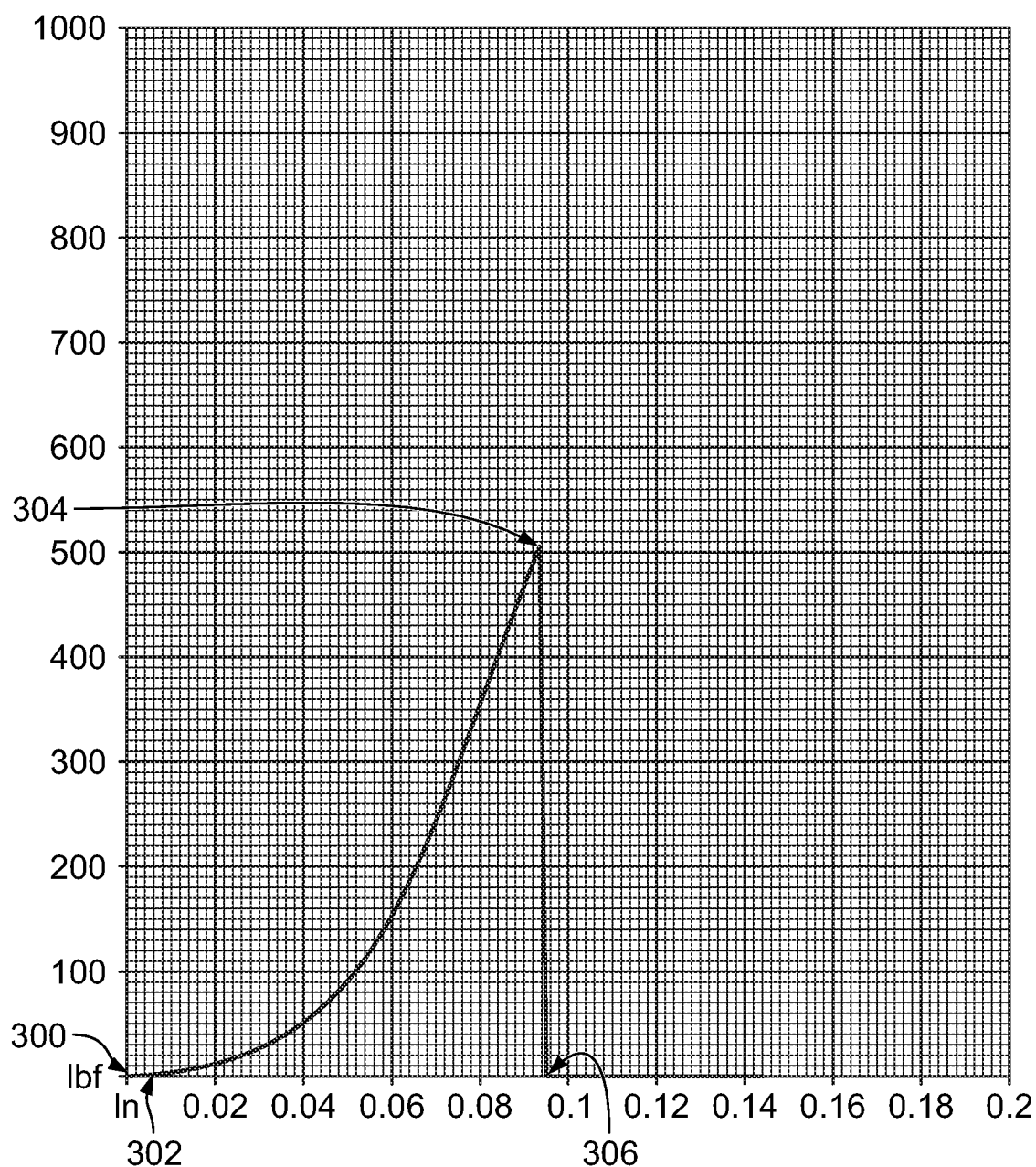
FIG. 3 illustrates experimental results showing variation of resistance force of a retention O-ring versus pulling distance, in accordance with another example implementation.

FIG. 3 illustrates experimental results showing variation of resistance force of the retention O-ring 200 versus pulling distance, in accordance with an example implementation. In FIG. 3, the y-axis depicts the pulling force applied to pull the components 202, 204 apart in lbf, whereas the x-axis depicts the pulling distance in inches (e.g., relative axial movement of one component relative to the other). The experimental results shown in FIG. 3 are obtained using a retention O-ring made of a Buna material (e.g., a copolymer of Acrylonitrile and Butadiene) and having 90 durometer hardness and a cross-sectional diameter of 0.05 inches, and the corner 222 having a radius of 0.01 in. The speed with which one component is being pulled from the other (e.g., via a pneumatic puller) is about 0.5 inch per minute.

As shown in FIG. 3, initially, the pulling force applied (or the resistance force of the retention O-ring 200) is zero at point 300 until the annular surface 216 presses the retention O-ring against the corner 222 at point 302. At the point 302, the retention O-ring 200 applies a break resistance force of about 0.075 lbf. From the point 302, as the pulling force increases, so does the resistance force of the retention O-ring 200 increase until a point 304 at which the shear stress limit of the retention O-ring 200 is reached. The force applied at the point 304 is about 506 lbf.

Once the shear stress limit is reached at the point 304, the retention O-ring 200 is ripped apart and the resistance force is abruptly decreased again to a substantially zero value at point 306. A total relative axial movement of the component being pulled at the point 306 is about 0.096 inches. Thereafter, the components 202, 204 can be disassembled or disengaged from each other.

As such, while the internal component 202 can be inserted with minimal force into the external component 204, the retention O-ring 200 retains the components 202, 204 with a large retention force (e.g., 506 lbf). This large retention force is sufficient to keep the components 202, 204 assembled and retained together while being subjected to any forces or vibration during handling, testing, and shipping prior to installation in a hydraulic system. With this configuration, the sleeve 104 can be retained within the housing 102 and the bushing 106 can be retained within the sleeve 104 using an inexpensive O-rings (the retention O-rings 172, 174), as opposed to using threads or wire rings.

At the same time, the valve 100 can be disassembled by applying a pulling force that exceeds the retention force of the retention O-ring 200 (e.g., exceeding 506 lbf) to facilitate performing maintenance operations on the valve 100. Another retention O-ring can then be used to revert the valve 100 back to its condition prior to ripping off the retention O-ring 200.

Figure 4:
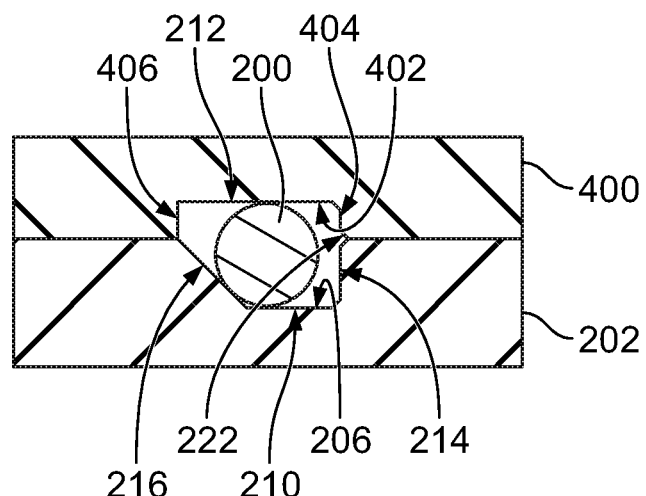
FIG. 4 illustrates a cross-sectional side view of an external component having an annular groove with straight side annular surfaces, in accordance with another example implementation.

Although FIG. 2 illustrates the annular surface 220 being angled, in other examples, the annular groove 208 might not have an angled annular surface bounding it, but rather may have two straight annular side surfaces. FIG. 4 illustrates a cross-sectional side view of an external component 400 having an annular groove 402 with straight side annular surfaces 404, 406, in accordance with an example implementation. As shown in FIG. 4, the annular surface 216, however, remains angled to facilitate pushing the retention O-ring 200 against the corner 222 when the components 202, 400 are pulled apart.

The configurations shown in FIGS. 2 and 4 can be reversed while maintaining the above-described functionality of the retention O-ring 200. Particularly, the configurations shown in FIGS. 2 and 4 illustrate the annular groove 206, which has the second annular surface 216 being angled, being disposed on the exterior peripheral surface 205 of the internal component 202. In other example configurations, the annular groove having the angled annular surface can be disposed on the interior peripheral surface of an external component, whereas the annular groove having a corner opposite the angled annular surface can be disposed in an exterior peripheral surface of an internal component.

Figure 5:
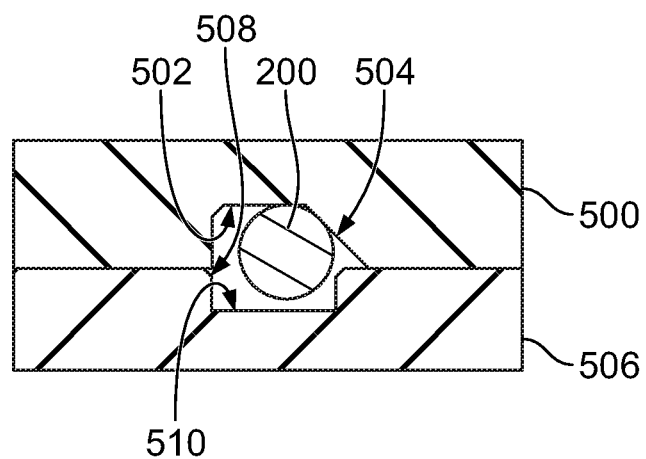
FIG. 5 illustrates a cross-sectional side view of an external component having an annular groove with an angled annular surface and an internal component having a corner opposite the angled annular surface, in accordance with an example implementation.

FIG. 5 illustrates a cross-sectional side view of an external component 500 having an annular groove 502 with an angled annular surface 504 and an internal component 506 having a corner 508 opposite the angled annular surface 504, in accordance with an example implementation. The configuration shown in FIG. 5 reverses the configuration shown in FIG. 4. Particularly, in FIG. 4, the internal component 202 includes the annular groove 206, which has the second annular surface 216 being angled, whereas the external component 400 includes the annular groove 402, which has the corner 222 diagonally opposite from the second annular surface 216. Conversely, in FIG. 5, the external component 500 includes the annular groove 502, which has the angled annular surface 504, whereas the internal component 506 includes an annular groove 510, which has the corner 508 diagonally opposite the angled annular surface 504.

In operation and functionality, however, the configuration of FIG. 5 is similar to the configurations of FIGS. 2 and 4. Similar to geometry of the annular grooves 206, 208 and annular grooves 206 and 402, geometry of the annular grooves 502, 510 facilitate retaining the components 500, 506 to each other via the retention O-ring 200 prior to installation in a manifold. If the internal component 506 is pulled apart from the external component 500 or vice versa, the angled annular surface 504 presses the retention O-ring 200 against the corner 508. Similar to the corner 222, the corner 508 has a radius as depicted in FIG. 5 and the retention O-ring 200 is thus subjected to shear stresses when the components 500, 506 are puled apart.

As pulling continue further, the resistance force increases more as the retention O-ring 200 is being squeezed between the angled annular surface 504 and the corner 508. As long as the pulling force is less than the shear stress yield limit of the retention O-ring 200, the components 500, 506 remain retained to each other. If the shear stress yield limit of the retention O-ring 200 is reached (e.g., during intentional disassembly via a pneumatic puller), the retention O-ring 200 can be ripped apart, thereby allowing the internal component 506 to be disassembled from the external component 500.

While the valve 100 shown in FIG. 1 illustrates the retention O-rings 172, 174 being disposed in annular grooves in a configuration similar to the configuration illustrated in FIG. 2, in other examples, one or both of the retention O-rings 172, 174 can be disposed in annular grooves in a configuration similar to the configuration illustrated in FIG. 4 or FIG. 5.

Figure 6:
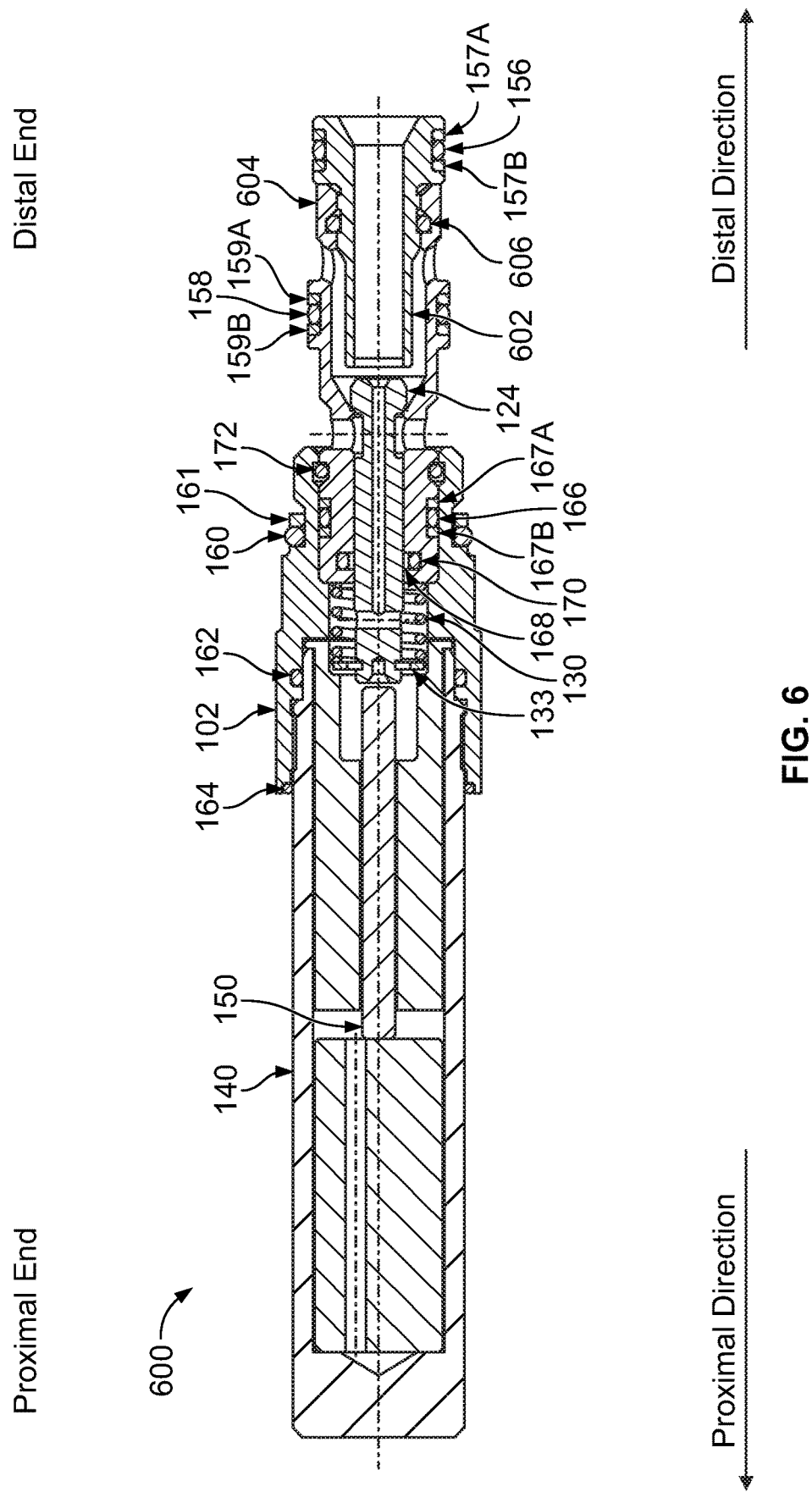
FIG. 6 illustrates a cross-sectional side view of a valve having a bushing retained within a sleeve via a retention O-ring, in accordance with an example implementation.

FIG. 6 illustrates a cross-sectional side view of a valve 600 having a bushing 602 retained within a sleeve 604 via a retention O-ring 606, in accordance with an example implementation. Similar components between the valve 100 and the valve 600 are designated using the same reference numbers. In the valve 100, both retention O-rings 172 and 174 are disposed in a groove configuration that is similar to the configuration in FIG. 2. In the valve 600, however, the retention O-ring 172 is disposed in a groove configuration similar to the configuration of FIG. 4, and the retention O-ring 606 is disposed in a groove configuration similar to the configuration of FIG. 5.

Particularly, the sleeve 604 is different from the sleeve 104 and the bushing 602 is different from the bushing 106 such that the sleeve 604 has an annular groove similar to the annular groove 502 rather than the annular groove 402, and the bushing 602 has an annular groove similar to the annular groove 510 rather than the annular groove 206. As such, the bushing 602 is retained within the sleeve 604 with a retention configuration similar to the retention configuration in FIG. 5 rather the retention configuration of FIG. 2 or FIG. 4.

In another example implementation, the retention configurations of the bushing within the sleeve and the sleeve within the housing can both be similar to the retention configuration of FIG. 5. In another example implementation, the retention configuration of the bushing within the sleeve can be similar to the retention configuration of FIG. 2 or FIG. 4, whereas the retention configuration of the sleeve within the housing can be similar to the retention configuration of FIG. 5.

Figure 7:
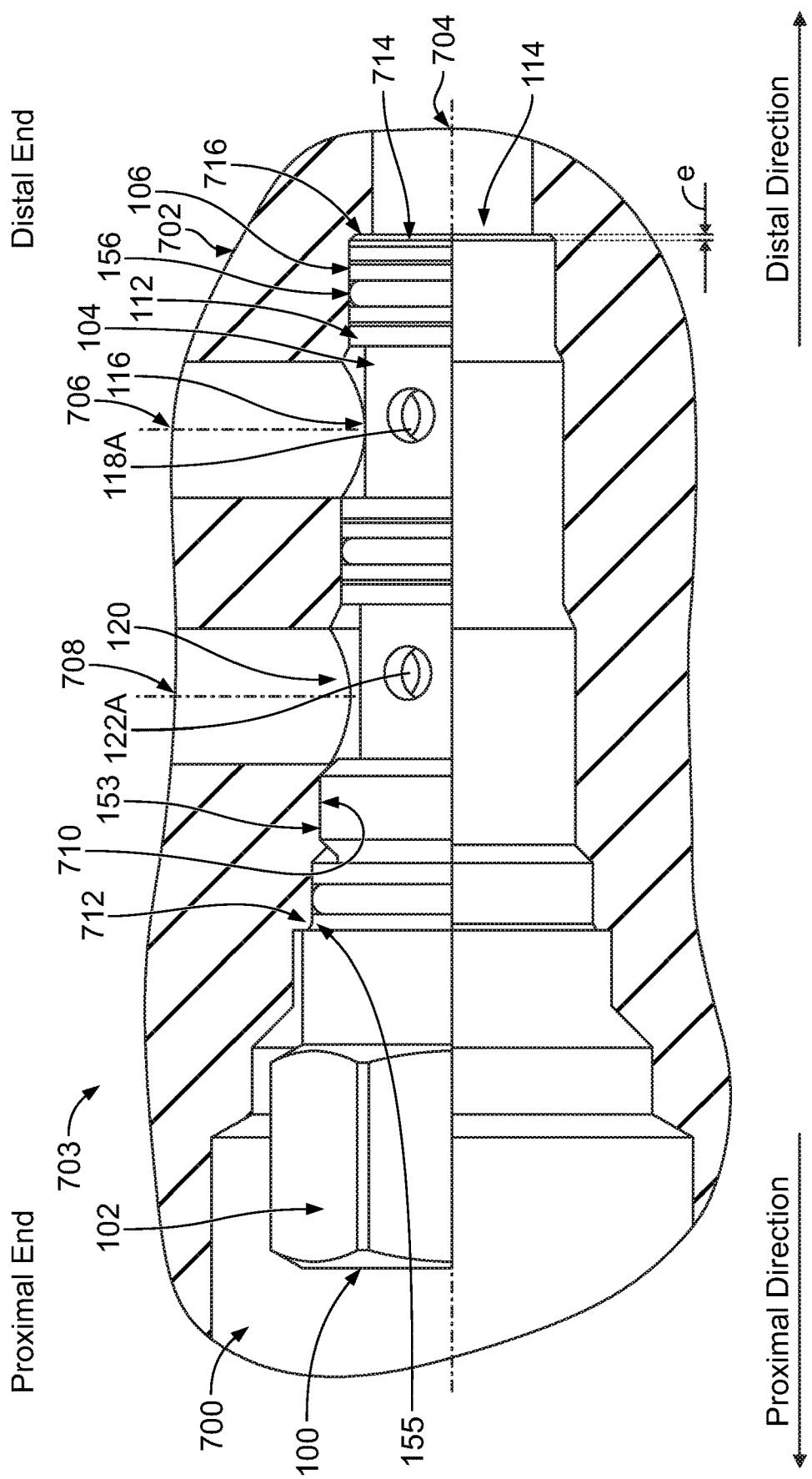
FIG. 7 illustrates a partial cross-sectional view of a valve installed in a cavity of a manifold, in accordance with an example implementation.

FIG. 7 illustrates a partial cross-sectional view of the valve 100 installed in a cavity 700 of a manifold 702, in accordance with an example implementation. Particularly, FIG. 7 illustrates an assembly 703 of the valve 100 and the manifold 702. In the description below, the valve 100 is used as an example for illustration; however, it should be understood that the description is applicable to the valve 600 or other valve configurations described above.

The manifold 702 is configured to have a first port 704 configured to align with and be fluidly coupled to the first port 114 of the bushing 106. The manifold 702 is configured to also have a second port 706 configured to align with and be fluidly coupled to the second port 116 of the sleeve 104. Further, the manifold 702 is configured to have a third port 708 configured to align with and be fluidly coupled to the third port 120 of the sleeve 104.

The cavity 700 of the manifold 702 is configured to receive the valve 100 therein. Particularly, the manifold 702 includes a threaded region 710 disposed on an interior peripheral surface of the manifold 702. The valve 100 is inserted and screwed into the cavity 700 to threadedly engage the threaded region 153 of the housing 102 with the threaded region 710 of the manifold 702. Further, when the valve 100 is inserted and screwed within the manifold 702, the housing locating shoulder 155 of the housing 102 mates with a manifold locating shoulder 712 to enable alignment of the housing 102 within the cavity 700 of the manifold 702.

In an example, if pressurized fluid is received at the first port 704, the bushing 106 can be thrusted or pushed in the proximal direction such that the shoulder 112 of the bushing 106 rests or is secured against the distal end of the sleeve 104. In turn, the sleeve 104 is thrusted or pushed in the proximal direction, such that the proximal end 131 of the sleeve 104 rests or is secured against the shoulder 132 of the housing 102 (see FIG. 1). In this example, referring to FIG. 7, a gap "e" separates a distal end 714 of the bushing 106 from a nose support shoulder 716 formed in the manifold 702. As an example for illustration only, the gap "e" represents a particular axial distance of about 0.01 in.

In another example, if pressurized fluid pressurized fluid is received at the second port 706 or the third port 708, the bushing 106 can be thrusted or pushed in the distal direction such that the distal end 714 of the bushing 106 mates with and is secured against the nose support shoulder 716 of the manifold 702. In this example, the gap "e" no longer separates the distal end 714 of the bushing 106 from the nose support shoulder 716.

With this configuration, the bushing 106 is "floating" and is allowed to have some axial "play" it traverses the gap "e" back and forth during operation of the valve 100. In an example, the sleeve 104 can also move axially along with the bushing 106 in the distal direction and the sleeve 104 is also floating within the housing 102. In conventional valves, a bushing is typically swaged-in, or screwed via threaded engagement into, the sleeve and is not configured to have axial "play." In other conventional valves a threaded nut is used to retain the bushing within the sleeve and the nut threadedly engages the sleeve rather than the bushing. Such configurations of conventional valves are more expensive due to the cost associated with swaging or machining threads in both the bushing or nut and the sleeve. Also, in such convention valves, a seal is added between the bushing and the sleeve to seal any clearance therebetween. Further, any misalignment between the bushing and the sleeve due to manufacturing tolerances can result in leakage, rendering the valve inoperable.

In contrast with such conventional valves, the bushing 106 is floating within the sleeve 104 and is allowed to move axially within the cavity 700 relative to the sleeve 104. This configuration eliminates the seal that exists in conventional valves between the bushing and the sleeve. Rather, the O-ring 156 disposed about the exterior peripheral surface of the bushing 106 seals against leakage between the bushing 106 and the manifold 702. As such, the configuration of FIG. 7 eliminates a leakage path that exists in conventional valves.

Also, the bushing 106 being floating in the disclosed configuration of FIG. 7, allows for less tight manufacturing tolerances to be used in making the valve 100 and the manifold 702 compared to conventional valves. Particularly, the configuration of the valve 100 with the bushing 106 being floating, can compensate for any lack of, or deviation in, concentricity between the bushing 106 and the sleeve 104, for example.

As an example, the valve 100 can include a radial clearance or radial "play" of about 0.001 inches between the poppet 124 and the sleeve 104. In other words, the valve 100 may include a clearance between the exterior peripheral surface of the poppet 124 and the interior peripheral surface of the sleeve 104. As such, as pressurized fluid is flowing through the valve 100, the poppet 124 can move radially in such clearance, and axially under pressure to engage with the bushing 106. As the poppet 124 engages with or contacts the bushing 106, the radial clearance between the poppet 124 and the sleeve 104 in addition to the gap "e" allow for adjusting the alignment of the bushing 106 within the cavity 700 to compensate for any misalignments or lack of concentricity resulting from manufacturing tolerances. As such, the valve 100 can be manufactured with less cost relative to convention valves because less stringent tolerances can be used in manufacturing the valve 100 compared to conventional valves.

Further, by virtue of the sleeve 104 being also floating within the housing 102, and the bushing 106 being floating within the sleeve 104, the torque applied to the housing 102 to tighten the threaded engagement between the threaded region 153 and the threaded region 710 is not transferred to the sleeve 104 or the bushing 106. As such, operation of the valve 100 is not sensitive to the torque applied to the housing 102. In contrast, convention valves are torque-sensitive because they typically have the sleeve threaded within the housing and/or the bushing threaded within the sleeve, and therefore the clamping force or the torque applied to tighten the threads of the housing, is transferred to the sleeve and/or the bushing, thereby rendering such conventional valves torque-sensitive. Such torque-sensitive configuration of convention valves limits the pressure level at which the valve can operate. In contrast, the configuration of the valve 100, which renders the valve 100 torque-insensitive, allows the valve 100 to operate at high pressure levels, e.g., greater than 5000 pounds per square inch (psi).

Notably, in examples, the gap "e" can be smaller than a width of a respective annular groove (e.g., the annular groove 208, 402, or 510) in which the retention O-rings 172, 174 are disposed. As such, as the bushing 106 and the sleeve 104 move axially during operation of the valve 100, the retention O-rings 172, 174 are not squeezed in the axial direction, i.e., no substantial compressive axial force is applied to the retention O-rings 172, 174. With this configuration, the retention O-rings 172, 174 do not deteriorate during operation of the valve 100, and they maintain their ability to retain the bushing 106 within the sleeve 104 and retain the sleeve 104 within the housing 102 when the valve 100 is removed from the cavity 700.

The valves 100, 600 can be used in several hydraulic systems. For instance, the valves 100, 600 can be used to control fluid flow to and from a single acting hydraulic cylinder. In the description below, the valve 100 is used as example to illustration operation of a hydraulic system; however, it should be understood that the description is applicable to the valve 600 or other valve configurations described above.

Figure 8:
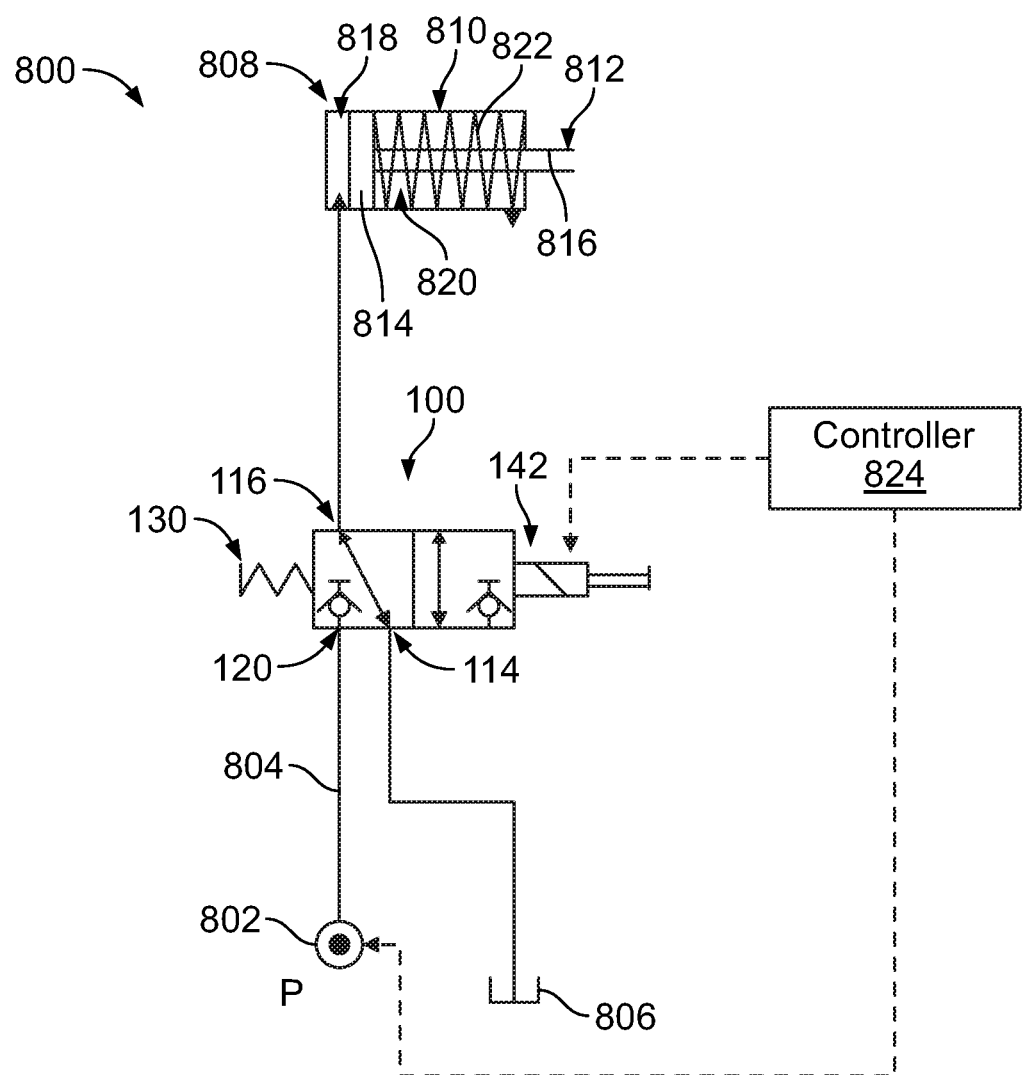
FIG. 8 illustrates a hydraulic system, in accordance with an example implementation.

FIG. 8 illustrates a hydraulic system 800, in accordance with an example implementation. The hydraulic system 800 includes a source 802 of pressurized fluid configured to provide a supply of pressurized fluid to a supply line 804.

The source 802 of pressurized fluid can, for example, be a pump configured to receive fluid from a tank 806, pressurize the fluid, and then provide the pressurized fluid to the supply line 804. Such pump can be a fixed displacement pump, a variable displacement pump, or a load-sensing variable displacement pump, as examples. A relief valve (e.g., electrohydraulic pressure relief valve that is not shown) can be coupled to the source 802 of pressurized fluid to set a particular pressure level for fluid provided by the source 802 of pressurized fluid to the rest of the hydraulic system 800. Additionally or alternatively, the source 802 of pressurized fluid can be an accumulator.

The hydraulic system 800 further includes a hydraulic actuator 808. The hydraulic actuator 808 includes a cylinder 810. The cylinder 810 can also be referred to as a barrel, body, or housing of the hydraulic actuator 808. The hydraulic actuator 808 also includes a piston 812 slidably accommodated in the cylinder 810. The piston 812 includes a piston head 814 and a rod 816 extending from the piston head 814 along a central longitudinal axis of the cylinder 810. The piston head 814 divides the cylinder 810 into a first chamber 818 and a second chamber 820.

A spring 822 is disposed within the cylinder 810 about the rod 816. A first end of the spring is secured against an interior surface of the cylinder 810, whereas a second end of the spring 822 rests against an annular surface of the piston head 814. With this configuration, the spring 822 biases the piston 812 in a proximal direction (e.g., to the left in FIG. 8).

The first port 114 of the valve 100 is fluidly coupled to the tank 806, the second port 116 is fluidly coupled to the chamber 818 of the hydraulic actuator 808, and the third port 120 is fluidly coupled to the source 802 via the supply line 804. The valve 100 is symbolically represented in FIG. 8 in an unactuated state where the third port 120 is blocked, and the second port 116 is fluidly coupled to the first port 114 to vent the chamber 818 to the tank 806 and allow the piston 812 to retract (e.g., move to the left in FIG. 8) via action of the spring 822 and/or gravity if the hydraulic actuator 808 is vertically-oriented.

The hydraulic system 800 can further include a controller 824. The controller 824 can include one or more processors or microprocessors and may include data storage (e.g., memory, transitory computer-readable medium, non-transitory computer-readable medium, etc.). The data storage may have stored thereon instructions that, when executed by the one or more processors of the controller 824, cause the controller 824 to perform operations described herein. Signal lines to and from the controller 824 are depicted as dashed lines in FIG. 8. The controller 824 can receive sensor information via signals from various sensors or input devices in the hydraulic system 800 and provide electric signals to various components of the hydraulic system 800.

For instance, the controller 824 can receive a command to extend the piston 812 (e.g., move the piston 812 to the right in FIG. 8), and in response, the controller 824 can send a command signal to the solenoid coil 142 of the valve 100 to generate a solenoid force on the armature 144. When a magnitude of the command signal reaches a setting of the valve 100 such that the solenoid force overcomes the biasing force of the spring 130, the poppet 124 moves off (i.e., away from) the seat 126 to open the valve 100, thereby actuating the valve 100.

When the valve 100 is actuated, the third port 120 is fluidly coupled to the second port 116, and pressurized fluid is provided from the source 802 via the supply line 804 and the third port 120 to the second port 116, and then to the chamber 818. As a result, the piston 812 can extend against action of the spring 822. In examples, the controller 824 can also send a command signal to the source 802 to set a particular pressure level for the pressurized fluid generated by the source 802. When the valve 100 is deactivated (e.g., the solenoid coil 142 is de-energized), the second port 116 is reconnected with the first port 114 and the tank 806, and the piston 812 retracts under action of the spring 822 and/or gravity if the cylinder 810 is vertically-oriented.

In other example hydraulic systems, the valve 100, 600 could be used as a selector valve. For instance, the source 802 can be fluidly coupled to the second port 116, and the valve 100 can selectively couple the second port 116 and the source 802 to either the first port 114 (when the solenoid coil 142 is de-energized) or the third port 120 (when the solenoid coil 142 is energized). These hydraulic systems are described herein as examples for illustration only, and the valves 100, 600 can be used in other hydraulic systems to implement other functionalities.

Figure 9:
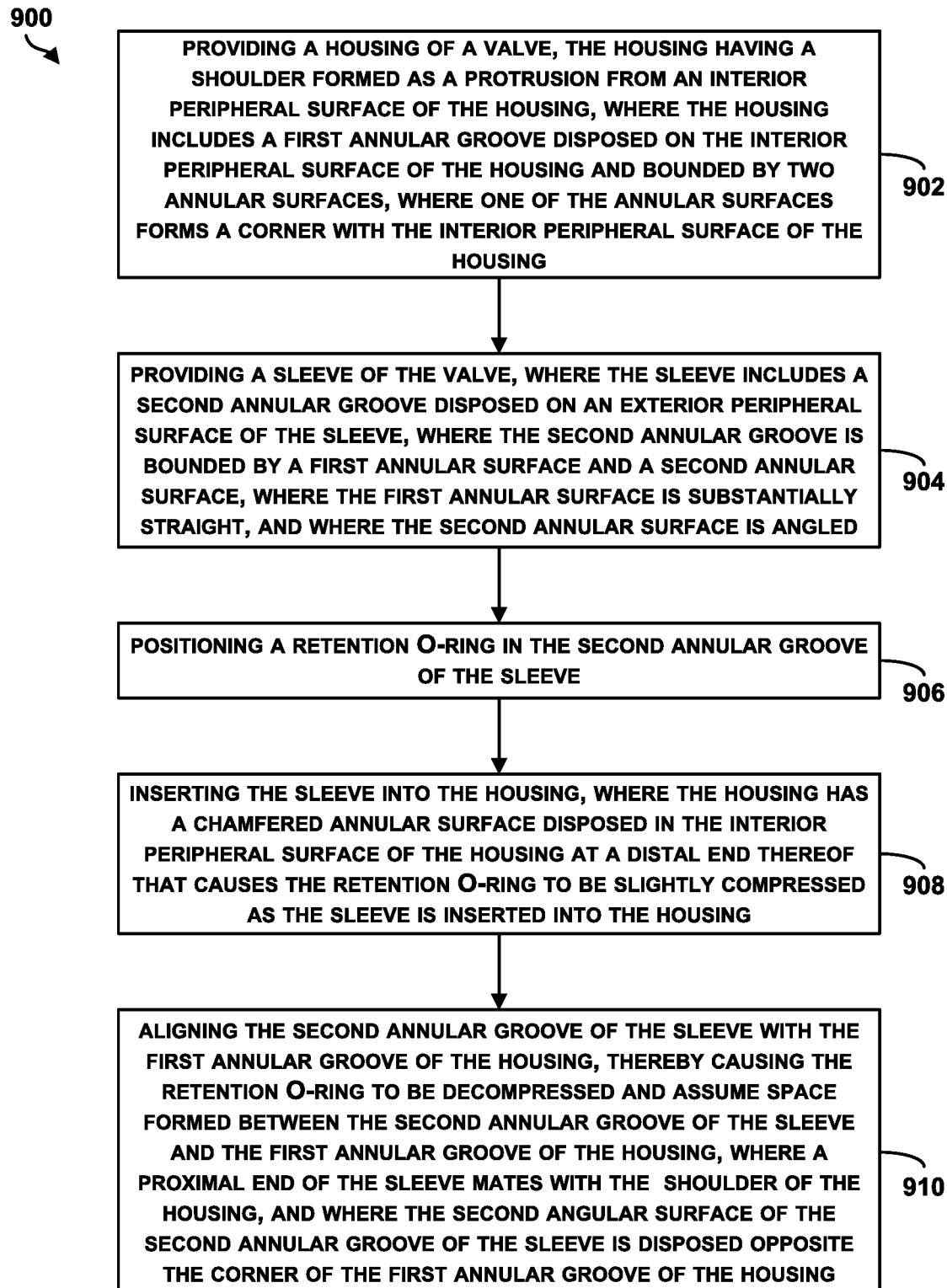
FIG. 9 illustrates a flowchart of a method of assembling a sleeve to a housing of a valve, in accordance with an example implementation.

FIG. 9 illustrates a flowchart of a method 900 of assembling a sleeve to a housing of a valve, in accordance with an example implementation. The method 900 shown in FIG. 9 presents an example of a method that could be used with any of the valves (e.g., the valves 100, 600) described above. The method 900 may include one or more operations, functions, or actions as illustrated by one or more of blocks 902-910. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 902, the method 900 includes providing the housing 102 of a valve (e.g., the valve 100, 600), the housing 102 having the shoulder 132 formed as a protrusion from the interior peripheral surface of the housing 102. The housing 102 also includes an annular groove (e.g., the annular groove 208 or 402). The annular groove of the housing 102 is bounded by two annular surfaces (e.g., the annular surfaces 218, 220 or the annular surfaces 404, 406). One of the annular surfaces (e.g., the annular surface 218) forms a corner (e.g., the corner 222) with the interior peripheral surface of the housing 102 (e.g., the interior peripheral surface 207). In examples, the corner can be configured to have a particular radius rather than being a sharp corner or have a sharp tip.

The term "providing" as used herein, and for example with regard to the housing 102 or other components, includes any action to make the housing 102 or any other component available for use, such as bringing the housing 102 or component to an apparatus or to a work environment for further processing.

At block 904, the method 900 includes providing the sleeve 104 of the valve, where the sleeve 104 includes an annular groove (e.g., the annular groove 206) disposed on the exterior peripheral surface of the sleeve 104. The annular groove is bounded by a first annular surface 214 and a second annular surface 216. While the first annular surface 214 is substantially straight (e.g., forms a substantially 90 degree angle with the base 210), the second annular surface 216 is angled.

At block 906, the method 900 includes positioning the retention O-ring 172 in the annular groove of the sleeve 104.

At block 908, the method 900 includes inserting the sleeve 104 into the housing 102 (e.g., into the longitudinal cylindrical cavity of the housing 102). The housing 102 can have the chamfered annular surface 178 disposed in the interior peripheral surface of the housing 102 at a distal end thereof, where the chamfered annular surface causes the retention O-ring 172 to be slightly compressed as the sleeve 104 is inserted into the housing 102.

At block 910, the method 900 includes aligning the annular groove of the sleeve 104 with the annular groove of the housing 102, thereby causing the retention O-ring 172 to be decompressed and assume the space formed between the annular groove of the sleeve 104 and the annular groove of the housing 102. The proximal end of the sleeve 104 can mate or rest against the shoulder 132 of the housing 102. The angled annular surface of the annular groove of the sleeve 104 is disposed opposite the corner of the annular groove of the housing 102. The retention O-ring 172 is thus configured to retain the sleeve 104 to the housing 102 during handling and shipping of the valve (i.e., prior to installation of the valve in a manifold).

Figure 10:
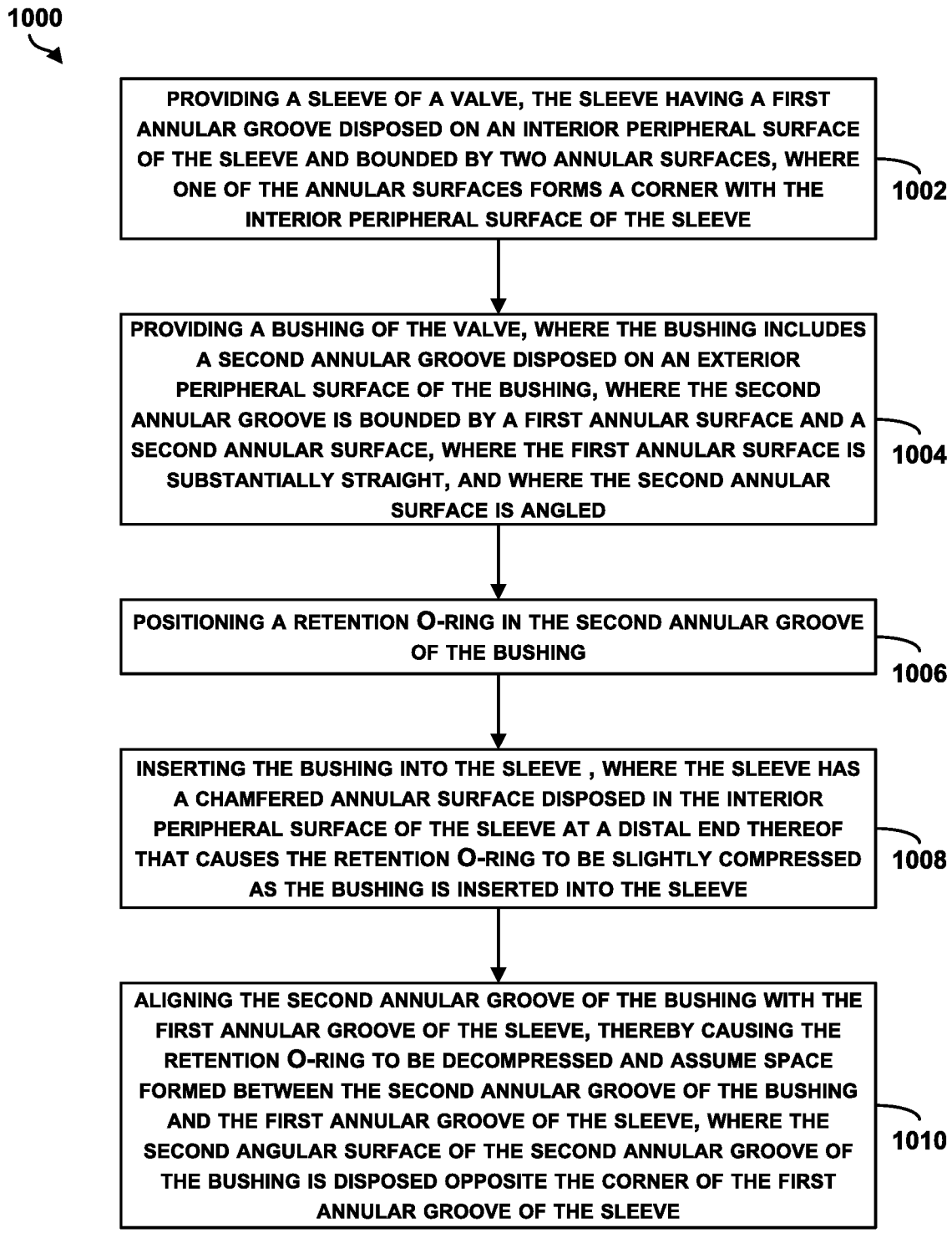
FIG. 10 a flowchart of a method of assembling a bushing to a sleeve of a valve, in accordance with an example implementation.

FIG. 10 illustrates a flowchart of a method 1000 of assembling a bushing to a sleeve of a valve, in accordance with an example implementation. The method 1000 shown in FIG. 10 presents an example of a method that could be used with any of the valves (e.g., the valves 100, 600) described above. The method 1000 may include one or more operations, functions, or actions as illustrated by one or more of blocks 1002-1010. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 1002, the method 1000 includes providing the sleeve 104 of a valve (e.g., the valve 100, 600), the sleeve 104 having an annular groove (e.g., the annular groove 208 or 402) disposed on an interior peripheral surface of the sleeve 104. The annular groove of the sleeve 104 is bounded by two annular surfaces (e.g., the annular surfaces 218, 220 or the annular surfaces 404, 406). One of the annular surfaces (e.g., the annular surface 218) forms a corner (e.g., the corner 222) with the interior peripheral surface of the sleeve 104 (e.g., the interior peripheral surface 207). In examples, the corner can be configured to have a particular radius rather than being a sharp corner or have a sharp tip.

At block 1004, the method 1000 includes providing the bushing 106 of the valve, where the bushing 106 includes an annular groove (e.g., the annular groove 206) disposed on the exterior peripheral surface of the bushing 106. The annular groove is bounded by a first annular surface 214 and a second annular surface 216. While the first annular surface 214 is substantially straight (e.g., forms a substantially 90 degree angle with the base 210), the second annular surface 216 is angled.

At block 1006, the method 1000 includes positioning the retention O-ring 174 in the annular groove of the bushing 106.

At block 1008, the method 1000 includes inserting the bushing 106 into the sleeve 104 (e.g., into the longitudinal cylindrical cavity of the sleeve 104). The sleeve 104 can have the chamfered annular surface 176 that causes the retention O-ring 174 to be slightly compressed as the bushing 106 is inserted into the sleeve 104.

At block 1010, the method 1000 includes aligning the annular groove of the bushing 106 with the annular groove of the sleeve 104, thereby causing the retention O-ring 174 to be decompressed an assume the space formed between the annular groove of the bushing 106 and the annular groove of the sleeve 104. The angled annular surface of the annular groove of the bushing 106 is disposed opposite the corner of the annular groove of the sleeve 104. The retention O-ring 174 is thus configured to retain the bushing 106 to the sleeve 104 during handling and shipping of the valve (i.e., prior to installation of the valve in a manifold).

Although the methods 900 and 1000 are described with references to the grooves of FIGS. 2 and 4, it should be understood that similar methods can be implemented with the groove configuration of FIG. 5.

Figure 11:
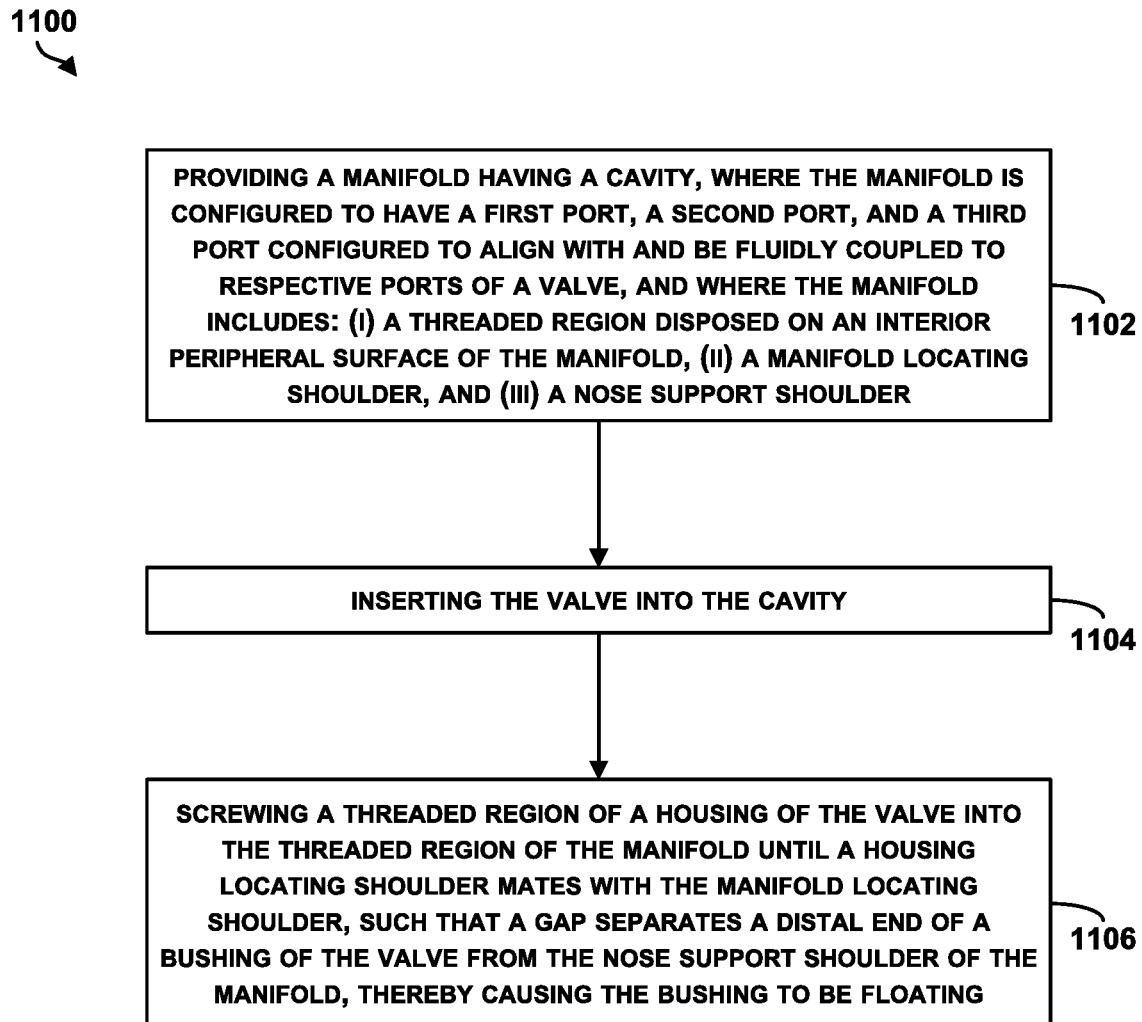
FIG. 11 a flowchart of a method of assembling a valve to a manifold, in accordance with an example implementation.

FIG. 11 illustrates a flowchart of a method 1100 of assembling a valve to a manifold, in accordance with an example implementation. The method 1100 shown in FIG. 11 presents an example of a method that could be used with any of the valves (e.g., the valves 100, 600) and the manifold 702 described above. The method 1100 may include one or more operations, functions, or actions as illustrated by one or more of blocks 1102-1106. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 1102, the method 1100 includes providing the manifold 702 having the cavity 700. The manifold 702 is configured to have the first port 704, the second port 706, and the third port 708 configured to align with and be fluidly coupled to respective ports of the valve. The manifold 702 includes: (i) the threaded region 710 disposed on the interior peripheral surface of the manifold 702, (ii) the manifold locating shoulder 712, and (iii) the nose support shoulder 716.

At block 1104, the method 1100 includes inserting the valve 100 into the cavity 700.

At block 1106, the method 1100 includes screwing the threaded region 153 of the housing 102 into the threaded region 710 of the manifold 702 until the housing locating shoulder 155 mates with the manifold locating shoulder 712, such that the gap "e" separates the distal end 714 of the bushing 106 from the nose support shoulder 716 of the manifold 702, thereby causing the bushing 106 to be floating.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
   a housing having a first longitudinal cavity therein;
   a sleeve disposed, at least partially, in the first longitudinal cavity, wherein the sleeve has a second longitudinal cavity therein, and includes a first seat formed as a protrusion from an interior peripheral surface of the sleeve;
   a poppet mounted within the second longitudinal cavity and configured to move axially therein; and
   a bushing mounted, at least partially, in the second longitudinal cavity, such that the bushing is floating and is allowed to move axially in the second longitudinal cavity, wherein the bushing is hollow and defines a first port at a distal end of the bushing and defines a second seat at a proximal end of the bushing, and wherein the sleeve defines a second port and a third port disposed on an exterior peripheral surface of the sleeve, such that:
      when the valve is unactuated, the poppet is seated on the first seat of the sleeve, to block fluid flow between the second port and the third port, while allowing fluid communication between the first port and the second port, and
      when the valve is actuated, the poppet moves off the first seat and is seated on the second seat of the bushing to allow fluid communication between the second port and the third port, while blocking fluid from to and from the first port.

2. The valve of claim 1, wherein the bushing comprises a base portion and a stem portion, wherein the stem portion is disposed within the second longitudinal cavity of the sleeve, whereas the base portion is configured as a respective protrusion that forms a shoulder interfacing with a distal end of the sleeve.

3. The valve of claim 1, wherein the bushing is allowed to move axially for a particular axial distance during operation of the valve.

4. The valve of claim 3, wherein the sleeve is retained within the housing via a first retention O-ring disposed between a first annular groove in the exterior peripheral surface of the sleeve and a second annular groove in an interior peripheral surface of the housing, wherein the bushing is retained within the sleeve via a second retention O-ring disposed between a third annular groove in an exterior peripheral surface of the bushing and a fourth annular groove in the interior peripheral surface of the sleeve, wherein the particular axial distance is less than a width of the third annular groove or the fourth annular groove.

5. The valve of claim 1, wherein the second port and the third port are each formed as a plurality of holes disposed in a radial array about the exterior peripheral surface of the sleeve.

6. The valve of claim 1, wherein the poppet comprises a front end, a back end, and an internal channel configured to communicate the fluid received at the front end through the first port or the second port to the back end of the poppet, such that pressure of the fluid is applied on both the front end and the back end of the poppet, and the poppet is pressure-balanced.

7. The valve of claim 6, wherein the poppet further includes a plurality of radial channels fluidly coupled to the internal channel and configured to communicate the fluid therefrom to a chamber within the housing in which the back end of the poppet is disposed.

8. The valve of claim 1, further comprising:
a solenoid actuator comprising:
   a solenoid tube disposed partially within the housing;
   an armature disposed within the solenoid tube;
   a push pin interfacing with the armature;
   a pole piece disposed within the solenoid tube such that an airgap separates the pole piece from the armature; and
   a solenoid coil that, when energized, causes the armature to traverse the airgap, thereby pushing the push pin toward the poppet, and causing the poppet to move off the first seat.

9. The valve of claim 1, further comprising:
a spring disposed about an exterior peripheral surface of the poppet between a proximal end of the sleeve and a retaining ring disposed about the exterior peripheral surface of the poppet, such that the spring biases the poppet toward the first seat.

10. An assembly comprising:
a valve comprising:
   a housing having (i) a first longitudinal cavity therein, (ii) a first threaded region disposed on an exterior peripheral surface of the housing, and (iii) a housing locating shoulder disposed on the exterior peripheral surface of the housing,
   a sleeve disposed, at least partially, in the first longitudinal cavity of the housing, wherein the sleeve has a second longitudinal cavity therein,
   a poppet mounted within the second longitudinal cavity and configured to move axially therein, and
   a bushing mounted, at least partially, within the second longitudinal cavity; and
a manifold having a cavity configured to receive the valve therein, wherein the manifold comprises: (i) a second threaded region disposed on an interior peripheral surface of the manifold, (ii) a manifold locating shoulder, and (iii) a nose support shoulder, such that: the first threaded region of the valve threadedly engages the second threaded region of the manifold, the housing locating shoulder mates with the manifold locating shoulder, and a gap separates a distal end of the bushing from the nose support shoulder of the manifold, thereby causing the bushing to be floating within the cavity of the manifold.

11. The assembly of claim 10, wherein the bushing comprises a base portion and a stem portion, wherein the stem portion is disposed within the second longitudinal cavity of the sleeve, whereas the base portion is configured as a protrusion having (i) a proximal end interfacing with a distal end of the sleeve, and (ii) the distal end of the bushing separated from the nose support shoulder of the manifold by the gap.

12. The assembly of claim 10, wherein the bushing is allowed to move axially to traverse the gap between the distal end of the bushing and the nose support shoulder of the manifold.

13. The assembly of claim 10, wherein the sleeve is retained within the housing via a first retention O-ring disposed between a first annular groove in an exterior peripheral surface of the sleeve and a second annular groove in an interior peripheral surface of the housing, wherein the bushing is retained within the sleeve via a second retention O-ring disposed between a third annular groove in an exterior peripheral surface of the bushing and a fourth annular groove in an interior peripheral surface of the sleeve, and wherein the gap is less than a width of the third annular groove or the fourth annular groove.

14. The assembly of claim 10, wherein the sleeve includes a first seat formed as a protrusion from an interior peripheral surface of the sleeve, wherein the bushing is hollow and defines a first port at the distal end of the bushing and defines a second seat at a proximal end of the bushing, and wherein the sleeve defines a second port and a third port disposed on an exterior peripheral surface of the sleeve, such that:
   when the valve is unactuated, the poppet is seated on the first seat of the sleeve, to block fluid flow between the second port and the third port, while allowing fluid communication between the first port and the second port, and
   when the valve is actuated, the poppet moves off the first seat and is seated on the second seat of the bushing to allow fluid communication between the second port and the third port, while blocking fluid from to and from the first port.

15. The assembly of claim 14, wherein as the poppet is seated on the second seat of the bushing, the bushing traverses, at least partially, the gap between the distal end of the bushing and the nose support shoulder of the manifold.

16. The assembly of claim 14, wherein the second port and the third port are each formed as a plurality of holes disposed in a radial array about the exterior peripheral surface of the sleeve.

17. The assembly of claim 10, wherein the poppet comprises: (i) a front end, (ii) a back end, (iii) an internal channel, and (iv) a plurality of radial channels fluidly coupled to the internal channel, wherein the internal channel and the plurality of radial channels fluidly couple the front end to the back end of the poppet, such that pressure of fluid is applied on both the front end and the back end of the poppet, and the poppet is pressure-balanced.

18. A method comprising:
providing a manifold having a cavity, wherein the manifold is configured to have a first port, a second port, and a third port configured to align with and be fluidly coupled to respective ports of a valve, wherein the manifold comprises: (i) a first threaded region disposed on an interior peripheral surface of the manifold, (ii) a manifold locating shoulder, and (iii) a nose support shoulder, and wherein the valve comprises: (i) a housing having a first longitudinal cavity therein, a second threaded region disposed on an exterior peripheral surface of the housing, and a housing locating shoulder disposed on the exterior peripheral surface of the housing, (ii) a sleeve disposed, at least partially, in the first longitudinal cavity of the housing, wherein the sleeve has a second longitudinal cavity therein, and (iii) a bushing mounted, at least partially, within the second longitudinal cavity;
inserting the valve into the cavity of the manifold; and
screwing the second threaded region of the housing into the first threaded region of the manifold until the housing locating shoulder mates with the manifold locating shoulder, such that a gap separates a distal end of the bushing from the nose support shoulder of the manifold, thereby causing the bushing to be floating within the cavity.

19. The method of claim 18, wherein the valve further comprises a poppet mounted within the second longitudinal cavity and configured to move axially therein, wherein the sleeve includes a first seat formed as a protrusion from an interior peripheral surface of the sleeve, wherein the bushing is hollow and defines a respective first port at the distal end of the bushing and defines a second seat at a proximal end of the bushing, and wherein the sleeve defines a respective second port and a respective third port disposed on an exterior peripheral surface of the sleeve, such that when the valve is unactuated, the poppet is seated on the first seat of the sleeve, to block fluid flow between the respective second port and the respective third port, while allowing fluid communication between the respective first port and the respective second port, wherein the method further comprises:

actuating the valve, thereby causing the poppet moves off the first seat and be seated on the second seat of the bushing to allow fluid communication between the respective second port and the respective third port, while blocking fluid from to and from the respective first port.

20. The method of claim 19, further comprising:

causing the bushing to traverse, at least partially, the gap between the distal end of the bushing and the nose support shoulder of the manifold.

* * * * *